United States Patent [19]

Baer et al.

[11] Patent Number: 5,044,865
[45] Date of Patent: Sep. 3, 1991

[54] SQUAT MECHANISM FOR VEHICLE TRAILER ASSEMBLY

[75] Inventors: Michael R. Baer, Maugansville, Md.; Francis S. Grata, Chambersburg, Pa.

[73] Assignee: Jerr-Dan Corporation, Greencastle, Pa.

[21] Appl. No.: 500,624

[22] Filed: Mar. 26, 1990

[51] Int. Cl.⁵ .............................................. B60P 1/32
[52] U.S. Cl. .................................... 414/477; 280/718; 414/480
[58] Field of Search ................................ 414/474–480, 414/482–485, 494; 280/718; 298/175

[56] References Cited

U.S. PATENT DOCUMENTS

| | | | |
|---|---|---|---|
| 1,377,913 | 5/1921 | Neff | 267/45 |
| 2,415,706 | 2/1947 | Ronk | 414/474 |
| 2,478,795 | 8/1949 | Whalen et al. | 280/43.18 |
| 2,753,064 | 7/1956 | Lesser | 414/475 |
| 2,754,128 | 7/1956 | Schramm | 280/43.18 |
| 2,774,606 | 12/1956 | Burweger et al. | 280/414.5 |
| 2,876,922 | 3/1959 | Holiday | 414/476 |
| 2,919,825 | 1/1960 | Hornsby | 414/474 |
| 3,032,217 | 5/1962 | Musson et al. | 414/477 X |
| 3,058,609 | 10/1962 | Jordan | 414/474 |
| 3,208,615 | 9/1965 | Wolf | 414/475 |
| 3,335,887 | 8/1967 | Snook | 414/476 |
| 3,430,791 | 3/1969 | Moss | 414/474 |
| 4,139,236 | 2/1979 | Hill et al. | 414/477 X |
| 4,195,863 | 4/1980 | Richardson | 280/718 X |
| 4,222,698 | 9/1980 | Boelter | 414/477 |
| 4,231,710 | 11/1980 | Landoll | 414/475 |
| 4,260,315 | 4/1981 | Bouffard | 414/478 X |
| 4,492,507 | 1/1985 | Landoll et al. | 414/475 |
| 4,630,991 | 12/1986 | Landoll et al. | 414/480 X |
| 4,750,856 | 6/1988 | Lapiolahti | 414/477 X |
| 4,770,592 | 9/1988 | Winter | 414/494 X |

FOREIGN PATENT DOCUMENTS

| | | | |
|---|---|---|---|
| 336313 | 10/1989 | European Pat. Off. | 414/477 |
| 2100084 | 7/1971 | Fed. Rep. of Germany | 298/175 |
| 2563198 | 10/1985 | France | 414/478 |

OTHER PUBLICATIONS

The "ACE" Stallion, by Winter Welding & Machine Corporation, 2580 W. Philadelphia St., York, Pa. 17404, 4 pages.

Primary Examiner—David A. Bucci
Attorney, Agent, or Firm—Dykema Gossett

[57] ABSTRACT

A vehicle trailer assembly is disclosed having a roll back frame for transport of a vehicle. A squat mechanism allows the roll back frame to define a smaller approach angle than normal with respect to the ground when in a loading position. The squat mechanism is self-actuated by movement of the roll back frame to the loading position and is self-releasing by return of the roll back frame to a transport position. The squat mechanism consists of a two bar mechanical linkage that compresses a spring which supports a main frame. By compressing the spring, the main frame is vertically lowered and the roll back frame, which pivots with respect to the main frame moves downwardly through a lesser distance. This lessens the approach angle to the roll back frame.

10 Claims, 3 Drawing Sheets

SQUAT MECHANISM FOR VEHICLE TRAILER ASSEMBLY

BACKGROUND OF THE INVENTION

This invention relates to transporting vehicles upon a roll back frame that is movable relative to a main frame. More particularly, the present invention relates to a mechanism for positioning the roll back frame such that it defines a relatively small approach angle with respect to the ground.

Prior art vehicle trailers are known having a roll back frame attached to a main frame. The roll back frame is moved with respect to the main frame from a transport position to a vehicle loading position at which it is pivoted with respect to the main frame and is in contact with the ground. A vehicle is moved upon the roll back frame and the roll back frame is moved back to the transport position on the vehicle. These prior art trailers have enjoyed success in recent years, however, some problems still exist with these assemblies.

One problem is that the main frame is a minimum distance above the ground to provide clearance while the trailer is being moved. The roll back frame is pivoted with respect to the main frame relative to a pivot point on the main frame. Thus, pivot point is at the same minimum distance above the ground as the main frame. This defines the approach angle the roll back frame makes relative to the ground. The greater the approach angle, the more difficult it is to move a vehicle upon the roll back frame.

These devices are often utilized for disabled vehicles that need repair and cannot be driven upon the roll back frame. Thus, it is known in the prior art to provide a mechanism for lowering the main frame and the pivot point to lessen the approach angle. One type of prior art device uses a complicated mechanism for compressing the support spring which interconnects a wheel axle to the main frame. By using this technique, the pivot point between the main frame and the roll back frame is also lowered and the approach angle is lessened. This prior art device requires manual actuation to engage and disengage the mechanism that lowers, or "squats" the pivot point. In addition, it requires several hydraulic cylinders and complex controls.

It is an object of the present invention to disclose a mechanism for "squatting" the main frame that is self-actuating as the hydraulic circuit drives the roll back frame from a transport position to a loading position.

It is further an object of the present invention to disclose such a mechanism that is self-releasing as the roll back frame moves from the loading position back to the transport position.

SUMMARY OF THE INVENTION

The present invention discloses a vehicle trailer having a main frame which pivotally supports a roll back frame. The main frame is connected to a wheel and axle through a resilient leaf spring coupling. The roll back frame is pivotable relative to the main frame about a pivot point from a transport position to a loading position at which one of its ends is in contact with the ground. The main frame is a minimum first distance above the ground and thus the pivot point is also at the minimum first distance above the ground. This first distance is a variable the controls the approach angle that the roll back frame defines with the ground. The present invention discloses a means for lowering, or "squatting", the main frame to a distance less than the minimum first distance above the ground, thus lessening the approach angle defined by the roll back frame and the ground.

In a disclosed embodiment of the present invention, the means for lowering is self-actuated by movement of the roll back frame from a transport position to a loading position. Further, in a disclosed embodiment of the present invention, the means for lowering is self-releasing when the roll back frame moves from the loading position back to the transport position.

In a preferred embodiment of the present invention, the means for lowering is a two bar linkage with an upper bar pivotally connected to the roll back frame and a lower link pivotally connected to the leaf spring which interconnects the axle and the main frame. The upper and lower links are pivotally interconnected at a central connection through a center pin received in an elongate slot in one link. The elongate slot extends for a distance greater than the diameter of the center pin thus allowing the two links to move relative to each other at the center connection.

When the roll back frame is in a transport position, the two links are bent with respect to each other such that a line extending from the pivot connection of the upper link to the roll back frame and through the central connection does not extend through the pivot connection of the lower link to the leaf spring. As the roll back frame is driven to rotate with respect to the main frame, the upper link and the lower link rotate with respect to their respective pivot connections until they reach an aligned position in which the line discussed above does extend through the pivot connection of the lower link to the leaf spring. Once this aligned position is reached, further rotation upwardly of the roll back frame causes an upward tension force between the upper link into the roll back frame and a downward reaction force from the lower link into the leaf spring that compresses the spring downwardly. As the spring moves downwardly so does the main frame, and the roll back pivot point, allowing the approach angle of the roll back frame to be lessened, with the benefits discussed above. The means for lowering is thus self-actuating by movement of the roll back frame from the transport position to the loading position.

As the roll back frame is rotated back from the loading position to the transport position, the two links move back towards the bent position. Once this happens, the spring is released back to an original position and the main frame moves upwardly to an original position. The roll back frame continues to rotate until it reaches a transport position.

In a most preferred embodiment of the present invention, the lower link has a pin at one lateral side, adjacent to the central slot. The upper link has a notch, also adjacent to the central slot. When the upper and lower link are in the aligned position discussed above, the pin is received within the notch.

Since the elongate slot extend for a distance greater than the diameter of the center pin, the upper and lower links can move relative to each other at the central connection. When the links first reach an aligned position, the center pin may be at an intermediate position in the slot. The pin and notch prevent rotation beyond this aligned position. As the roll back frame continues to rotate the center pin moves in the slot and abuts the top end of the slot in the lower link. After reaching this position, further movement causes the tension force from the links to pass into the roll back frame and the main frame. These forces compress the spring and lower the main frame.

When the roll back frame rotates from the loading position to the transport position compressive forces are applied to the pivot points between the upper link and the roll back frame and the lower link and the spring. This causes the two links to move relative to each other. After a small amount of movement the pin abuts the notch and further movement of the two links relative to each other at that position is blocked. The compression forces from the two pivot points are thus directed inwardly through the abutting contact point between the pin and the notch. This contact point is laterally off-set from the central connection of the upper and lower links and creates a moment force about the pivot connections between the upper link and the roll back frame and the lower link and the spring. The moment force causes the upper link and lower link to rotate with respect to each other back to the bent position. The means for lowering is self-releasing as the roll back frame moves from a loading position back to a transport position.

The lower link may be attached to a disengagement bracket on the roll back frame when it is not desired to utilize the means for lowering. The means for lowering is typically disengaged during transport, or when the reduced approach angle is not necessary.

These and other objects and features of the present invention can be best understood from the following specification and drawings of which the following is a brief description.

DETAILED DESCRIPTION OF A PREFERRED EMBODIMENT

Figure 1:
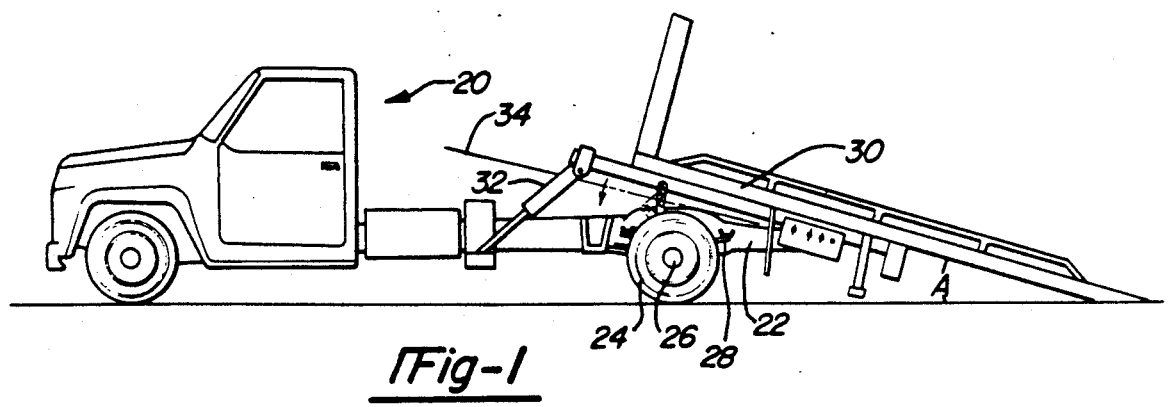
FIG. 1 is side view showing a vehicle trailer.

Trailer assembly 20 is illustrated in FIG. 1 ant includes main frame 22 supported by rear wheel 24 which is mounted on axle 26. Main frame 22 is connected to axle 26 through resilient spring 28, which is shown somewhat schematically here.

Roll back frame 30 is supported upon main frame 22 and movable through hydraulic cylinder 32 from a transport position where it overlies and extends generally parallel to main frame 22 to a loading position, illustrated in FIG. 1, in which it contacts the ground. An angle A is defined between roll back frame 30 and the ground and can be defined as an approach angle for a vehicle that is to be loaded upon roll back frame 30.

When it is desired to load a vehicle upon trailer assembly 20, roll back frame 30 is moved to the loading position illustrated in FIG. 1, and the vehicle is then moved onto roll back frame 30. This type of trailer assembly is often used for disabled vehicles, where it may be difficult to move a vehicle upon roll back frame 30. As can be understood, the greater approach angle A, the greater the force that must be overcome to move a vehicle upon roll back frame 30.

Line 34 defines a lesser approach angle with the ground that reduces the force necessary to move a vehicle upon roll back frame 30. For this reason, it may sometimes be desirable to lessen the approach angle A to the angle defined by line 34.

Roll back frame 30 is pivoted downwardly about a pivot point on main frame 22 to contact the ground. Main frame 22, and the pivot point, must remain a minimum distance above the ground to provide ground clearance during vehicle transport. Thus, the distance roll back frame 30 must pivot downwardly is dependent upon this minimum distance. It would be desirable to lower main frame 22, thus lowering the pivot point and the distance roll back frame 30 must pivot downwardly, resulting in a lessened approach angle A.

Figure 2:
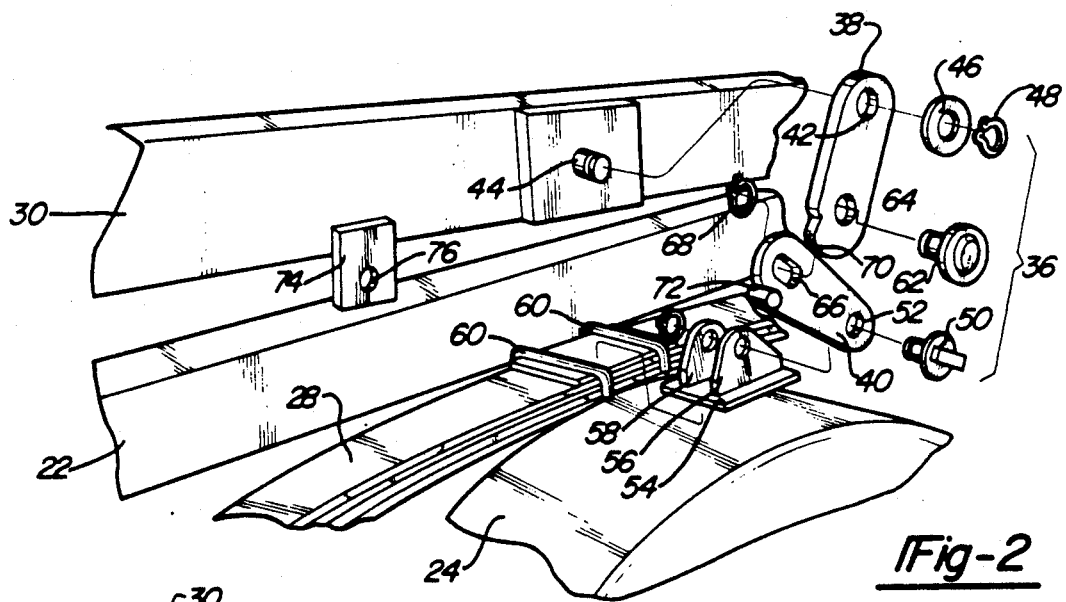
FIG. 2 is an exploded assembly view of a squat mechanism according to the present invention.

A means for lowering main frame 22 is illustrated in FIG. 2 and may be defined as squat mechanism 36 which includes a two bar linkage with an upper link 38 and lower link 40. Upper link 38 is connected through pivot opening 42 to pin 44 on roll back frame 30. Washer 46 and lock ring 48 complete the connection. Alternatively, washer 46 may be welded to pin 44. Pin 50 extends through pivot opening 52 in lower link 40 and is connected to attachment member 54 having flanges 56 rnd 58 on each side of link 40. Although a lock ring is illustrated, a hairpin attachment member may pass through pin 50 to connect it to attachment member 54. Attachment member 54 is received underneath C-shaped straps 60 which form a portion of spring 28. Center pin 62 is welded within an aperture 64 in upper link 38 and passes through an elongate slot 66 in lower link 40. Elongate slot 66 is of a greater length than the diameter of center pin 62, thus allowing relative movement of links 38 and 40 at center pin 62. Lock ring 68 secures center pin 62 within slot 65. Upper link 38 has notch 70 formed adjacent to aperture 64 while lower link 40 has pin 72 also formed adjacent elongate slot 66.

Disengagement bracket 74 has pin hole 76 that can receive pin 50 to connect lower link 40 to roll back frame 30 when it is not desired to utilize squat mechanism 36. Squat mechanism 36 may be disengaged during transport or loading of certain vehicles to reduce the stress on spring 28. Pivot pin 50 has a thumb flange such that it can be easily removed to disconnect squat mechanism 36.

Figure 3:
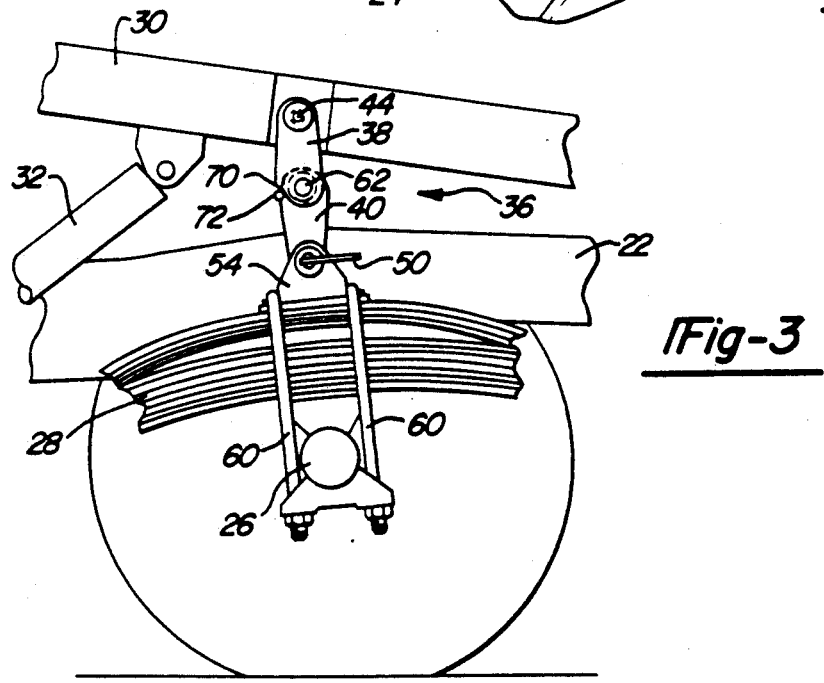
FIG. 3 shows the means for lowering of the present invention before lowering of the main frame.

FIG. 3 shows the position of the various members just prior to squat mechanism 36 moving main frame 22 vertically downwardly. Cylinder 32 is driving roll back frame 30 clockwise, as shown in the figure, and upper link 38 has moved into an aligned position relative to lower link 40 such that a line extending from pivot 44 through center pin 62 extends through pivot pin 50. Once the aligned position is reached notch 70 and pin 72 prevent further rotation. In the position shown in FIG. 3, spring 28 has not been compressed and main frame 22 is still at a normal first distance above the ground that provides sufficient clearance for transport of trailer assembly 20.

When links 38 and 40 first reach an aligned position center pin 62 may be at an intermediate position in slot 66. As roll back frame 30 continues to rotate center pin 62 moves in slot 66 and abuts the top end of slot 66 in lower link 40. After reaching this position, further movement causes a tension force from links 38 and 40 into roll back frame 30 and spring 28 which compresses the truck spring and lowers main frame 22.

Figure 4:
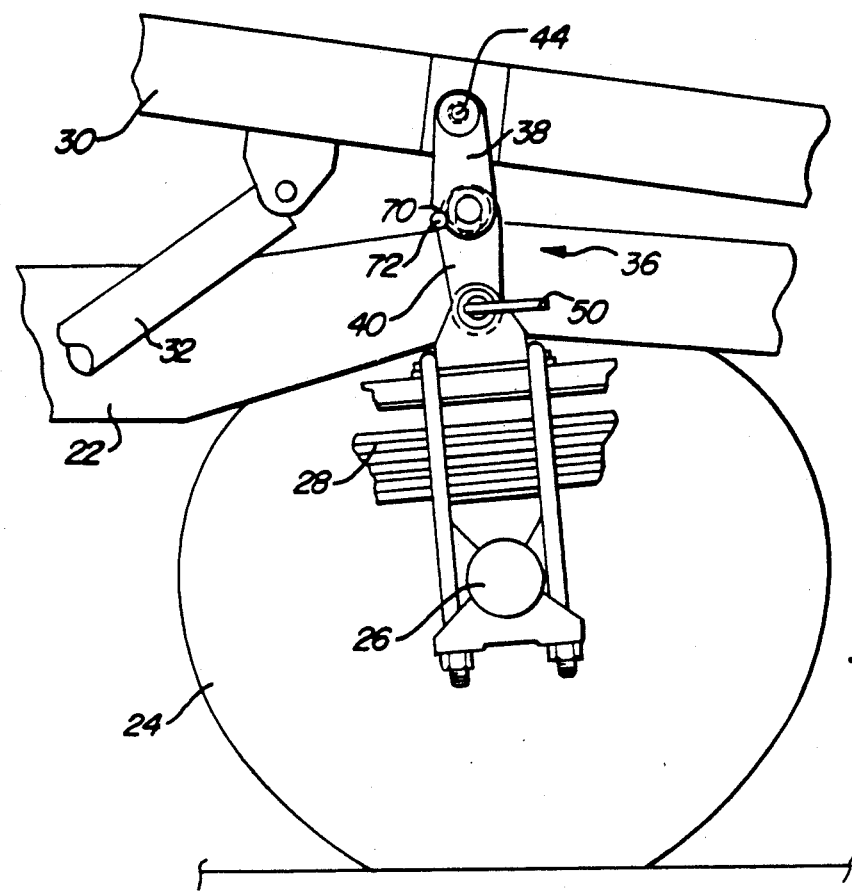
FIG. 4 is a view similar to FIG. 3, after the main frame has been lowered.

FIG. 4 illustrates trailer assembly 20 once cylinder 32 has rotated roll back frame 30 slightly further from the position illustrated in FIG. 3. Once upper link 38 and lower link 40 become aligned and center pin 62 abuts the end slot 66, further pivotal movement of roll back frame 30 relative to main frame 22 forces pin 44 vertically upwardly. However, squat mechanism 36 connects roll back frame 30 and main frame 22 and thus, pivot 44 cannot actually move upwardly. This causes a tension force to be directed upwardly to pin 44 and a corresponding reaction force to be directed to pivot pin 50 into spring 28. This force compresses spring 28, lowering main frame 22. Roll back frame 30 pivots to the ground about a point on main frame 22. When main frame 22 is lowered so is the pivot point and the distance roll back frame 30 must travel downwardly to contact the ground is lessened. The approach angle A to roll back frame 30 is lessened.

Figure 5:
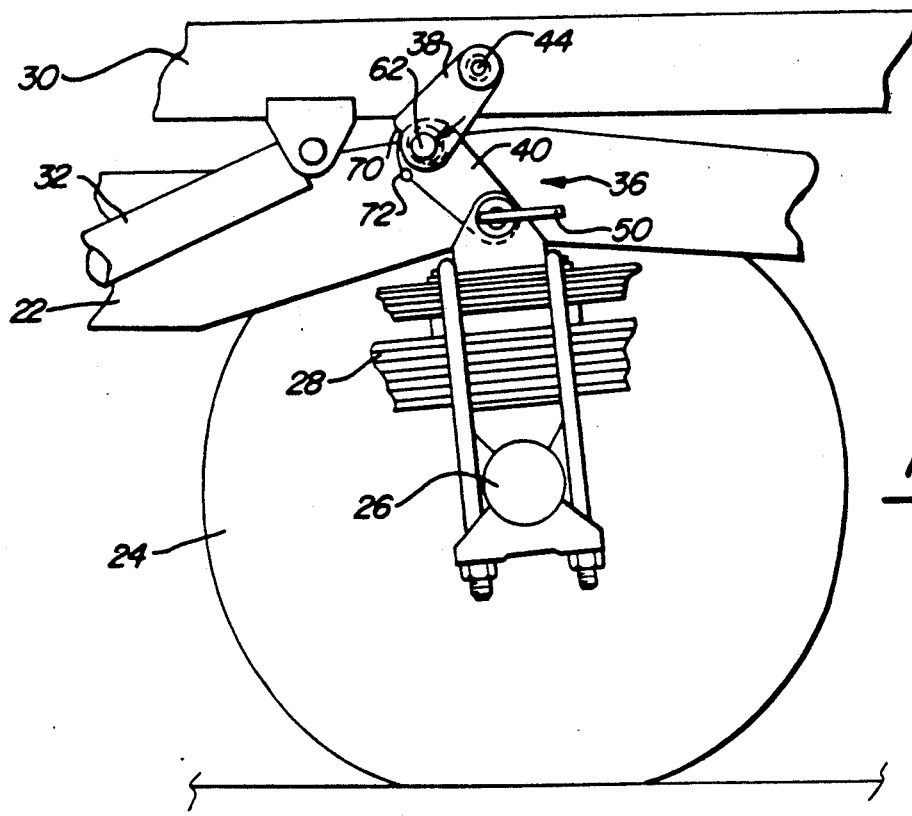
FIG. 5 shows the means for lowering of the present invention in a transport position.

FIG. 5 shows squat mechanism 36 in a transport position for transporting a vehicle on roll back frame 30. As cylinder 32 begins to move roll back frame counterclockwise to return it to a transport position, squat mechanism 36 moves to a position in which upper link 38 is bent relative to lower link 40. The mechanical details of this movement will be explained below. When in this bent position, a line extending from pivot 44 through center pin 62 does not pass through pivot 50. As is also clear, the vertical distance between pivot pin 44 and pivot pin 50 is less in this bent position than in the aligned positions illustrated in FIGS. 3 or 4.

The sequential operation of squat mechanism 36 between the aligned position illustrated in FIGS. 3 and 4 and the bent position illustrated in FIG. 5 will now be explained in detail with reference to FIG. 6. The movement of links 38 and 40 relative to each other is for a relatively small distance. For simplicity, these small distances are ignored in FIG. 6.

Figure 6:
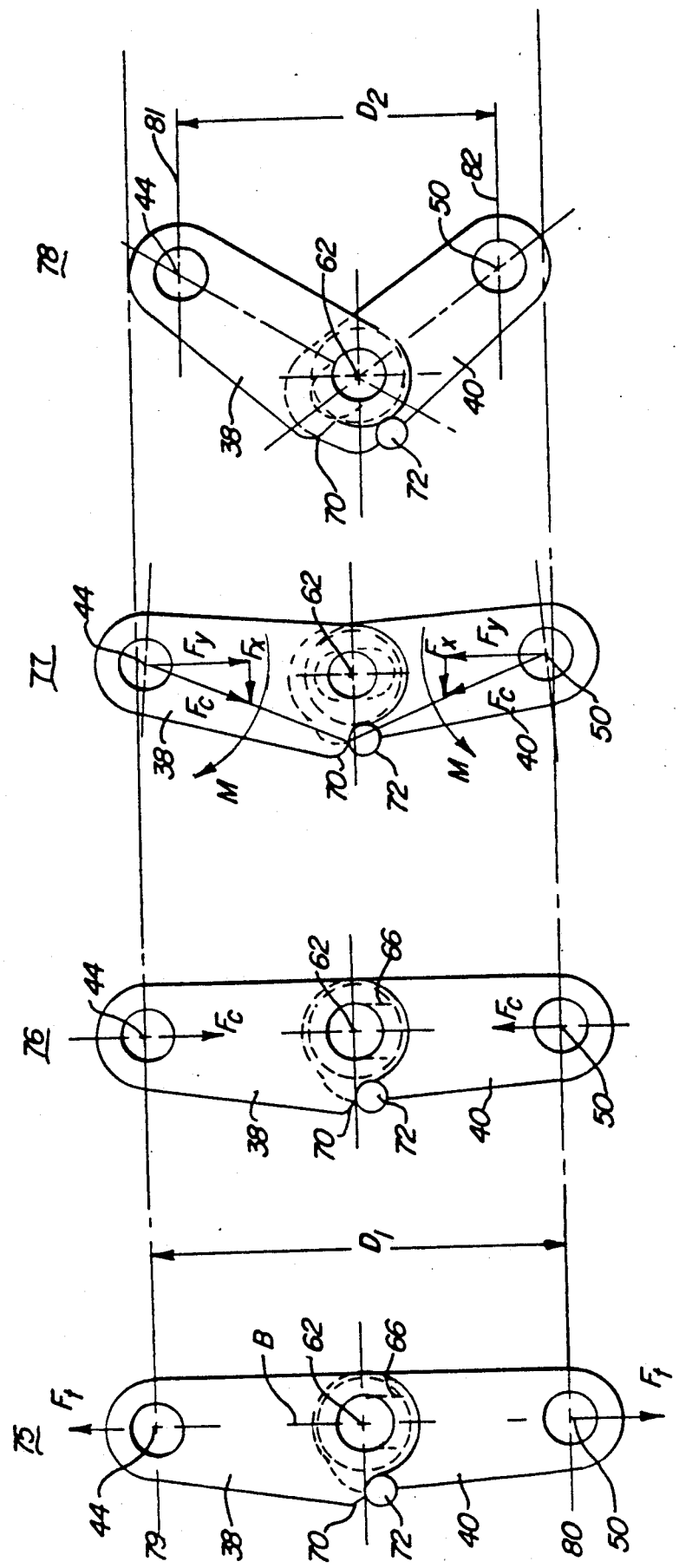
FIG. 6 shows consecutive steps in the movement of the means for lowering of the present invention.

FIG. 6 illustrates squat mechanism 36 in an aligned first position 75 in which a line B extends from pivot 44 through center point 62 and through pivot 50. When links 38 and 40 first reach an aligned position center pin 62 may be at an intermediate position in slot 66. Once this aligned position is reached further rotation is blocked by pin 72 and notch 70. As roll back frame 30 continues to rotate center pin 62 moves in slot 66 and abuts the top end of slot 66 in lower link 40. After reaching this position, further movement causes a tension force from links 38 and 40 into roll back frame 30 at pivot 44 and into spring 28 at pivot 50.

As is explained above with reference to FIG. 3 and 4, squat mechanism 36 reaches this position while roll back frame 30 is being driven vertically upwards, or clockwise as shown in FIGS. 3 and 4. Pivot 44 is forced upwardly and a tension force $F_t$ is applied at pivot 44. An opposed reaction force $F_t$ is applied downwardly through pivot 50 into spring 28. This tension force compresses truck spring 28 and lowers main frame 22.

Squat mechanism 36 is shown at position 76 in which upper link 38 and lower link 40 are about to snap to the bent position. Once a vehicle has been moved onto (or off) roll back frame 30, hydraulic cylinder 32 begins rotating roll back frame 30 to a transport position. Roll back frame 30 is moved vertically downwardly, or counterclockwise as shown in FIGS. 3-5. Pivot 44 directs a compression force applied through center pin 62 and into pivot 50. An opposed reaction force $F_c$ is applied upwardly from pivot 50. In this position, roll back frame 30 has not yet returned to a transport position and must still rotate further counterclockwise and downwardly.

As shown at 77, roll back frame 30 has continued to rotate counterclockwise and continues to apply compression force $F_c$ inwardly from pivots 44 and 50. Slot 66 allows center pin 62 to move, thus allowing lower link 40 to move relative to upper link 38. However, after a small amount of movement pin 72 abuts notch 70 and prevents any movement of links 38 and 40 with respect to each other at the abutting contact point. This causes compression force $F_c$ to no longer be directed through center pin 62, but instead to be directed from pivots 44 and 50 through pin 72. Force $F_c$ now comprises a vertical component $F_y$ and a lateral component $F_x$ creating a moment force M about each pivot 44 and 50, tending to rotate links 38 and 40 in opposite directions.

As roll back frame 30 continues to rotate counterclockwise and downwardly, the downward force on pivot 44 continues to be applied. At some point, moment M overcomes the frictional forces holding links 38 and 40 together and squat mechanism 36 snaps to the bent position illustrated at 78. Thus, squat mechanism 36 is self-releasing by movement of roll back frame 30. In this bent position, a line extending from pivot 44 through center pin 62 does not pass through pivot 50.

Upper line 79 defines the vertically uppermost position of pivot 44, while lower line 80 defines the vertically lowermost position of pivot pin 50. The highest vertical extent of pivot pin 44 is achieved while squat mechanism 36 is in positions 75 and 76. The lowest vertical position of pivot pin 50 is also in those two positions.

When squat mechanism is in position 77, just prior to snapping to bent position 78, the center of pivot 44 is slightly below line 79 while the center of pivot 50 is slightly above line 80. In this position, truck spring 28 is beginning to move back to an uncompressed state.

In position 78, squat mechanism 36 is in a bent position, line 81 defines the vertical center of pivot 44, while second line 82 defines the vertical center of pivot 50. As is clearly shown, the distance $D_1$ between lines 79 and 80 is greater than a distance $D_2$ between lines 81 and 82. The difference between lines 80 and 82 is approximately equal to the distance that lower frame 30 is moved downwardly by squat mechanism 36. It should be understood that this distance need not be great to provide a significant lessening of approach angle A.

It should also be understood that the movement between positions 75 and 78 through positions 76 and 77 happens extremely rapidly. Squat mechanism 36 is not in position 76 or position 77 for any great length of time.

When roll back frame is moved from a transport position back to a loading position, upper link 38 rotates counterclockwise from the position while lower link 40 rotates clockwise. The links continue to rotate in order to provide sufficient length to connect roll back frame 30 and main frame 22. Pivots 44 and 50 are moving apart, and thus additional length is necessary to connect them through the two bar linkage. The links 38 and 40 continue to rotate until they reach position 75, squat mechanism 36 is thus self-actuating.

A method of achieving a lessened approach angle to a roll back frame will now be described with reference to the figures. When it is desired to have a lessened approach angle A to roll back frame 30, lower link 40 is attached through pin 50 to attachment member 54. It is attached while upper link 38 is in a bent position relative to lower link 40. Hydraulic cylinder 32 begins to move roll back frame 30 to a loading position, and roll back frame 30 begins to rotate counterclockwise or upwardly. This causes pivot 44 to move upwardly and upper link 38 to rotate counterclockwise, as shown in the figures. Meanwhile, lower link 40 rotates clockwise. This rotation is caused by the need for additional length between the two links 38 and 40 to compensate for the increasing distance between pivot 44 and pivot 50.

Once upper link 38 has moved to a position relative to lower link 40 such that a line extends between pivot 44, center pivot 62 and through pivot 50, links 38 and 40 can be said to be in an aligned position. Further upward movement of roll back frame 30 causes a tension force upwardly on pivot 44 and a reactive downward force on pivot 50.

This downward force compresses truck spring 28 which causes main frame 22 to be vertically lowered. Roll back frame 30 pivots with respect to main frame 22, and this downward movement lessens the distance that roll back frame 30 must move downwardly in order to engage the ground. When this distance is lessened, approach angle A is correspondingly lessened. Thus, it becomes easier to load a vehicle upon roll back frame 30. Squat mechanism 36 is self-actuated to lower the main frame by the movement of roll back frame 30 relative to main frame 22. No drive or control other than that for rotating roll back frame 30 is necessary.

To return roll back frame 30 to a transport position, hydraulic cylinder 32 drives it counterclockwise and downwardly. As pivot 44 begins to move downwardly, compression force $F_c$ is applied inwardly from pivot 44 through center pin 62. Center pin 62 moves within slot 66 in link 40, however, pin member 72 soon abuts notch 70 preventing any further relative vertical movement between upper link 38 and lower link 40. A force $F_c$ caused by downward movement of pivot 44 is transferred to a line from pivot 44 through pin 72. A moment M is created about pivots 44 and 50 tending to cause upper link 38 to rotate clockwise and lower link 40 to rotate counterclockwise. Once this moment overcomes the frictional resistance to movement between upper link 38 and lower link 40, the links will "snap" to a bent position, illustrated in FIG. 6 at 78. The roll back frame 30 continues to move downwardly until it returns to a transport position illustrated in FIG. 5. Squat mechanism 36 is thus self-releasing by the movement of roll back frame 30 relative to main frame 22. Again, no drive or control other than that for rotating roll back frame 30 is necessary.

When squat mechanism 36 is not needed, pin 50 is removed from attachment member 54 and lower link 40 is attached to disengagement bracket 74 with pin 50 extending into opening 76.

Also, there could be a pair of slots, with one formed in each of links 38 and 40. Such an arrangement would allow relative movement between the links.

A preferred embodiment of the present invention has been disclosed, however, a worker of ordinary skill in the art would realize that certain modifications would be within the scope of this invention and thus the following claims should be studied in order to determine the true scope of the invention.

We claim:

1. A trailer assembly for transporting vehicles comprising:

a main frame supported a vertical distance off the ground;

a roll back frame supported on said main frame and moveable relative thereto from a transport position at which it is removed from the ground, to a loading position at which it has moved downwardly through said vertical distance and engages the ground;

means for lowering said main frame to reduce said vertical distance, thus lessening an approach angle defined by said roll back frame and the ground when said roll back frame is in said loading position, said means for lowering being self-actuated by the movement by said roll back frame from said transport position towards said loading position;

said means for lowering being self-releasing when said roll back frame moves from said loading position to said transport position, the release of said means for lowering allowing said main frame to return vertically upwardly; and wherein said main frame is supported off the ground by a spring, which provides a resilient connection between said main frame and a wheel axle, said means for lowering is a two-bar linkage with an upper link pivotally connected to said roll back frame and a lower link pivotally connected to said spring, said upper and lower links being connected to each other at a central connection.

2. A trailer assembly as recited in claim 1, wherein said upper and lower links being normally in a bent position with respect to each other when said roll back frame is in said transport position, such that a line extending from the pivot connection of said upper link to said roll back frame through said central connection of said upper and lower links does not intersect the pivot connection of said lower link and said spring, and when said roll back frame is in said loading position, said upper and lower links being rotated to an aligned position wherein said line extending from the pivot connection of said upper link to said roll back frame through said central connection passes through the pivotal connection of said lower link and said spring.

3. A trailer assembly as recited in claim 2, wherein the self-actuating feature being the movement of said links to said aligned position.

4. A trailer assembly as recited in claim 3, wherein said roll back frame is rotated by a hydraulic cylinder, said rotation of said roll back frame moving said upper and lower links to said aligned position, further rotation causing a downward force on said spring thus moving said main frame downwardly.

5. A trailer assembly as recited in claim 4, wherein said upper link having a notch adjacent said central connection and said lower link having a pin adjacent said central connection, said pin being positioned outwardly of said notch when said upper and lower links are in said bent position and said pin being received within said notch when said upper and lower links have moved to said aligned position.

6. A trailer assembly as recited in claim 5, wherein said center connection of said upper and lower links includes a center pin received through a slot in one of said upper and lower links, said slot being elongate and extending for a distance greater than the diameter of said center pin thus allowing relative sliding movement of said upper link with respect to said lower link at said central connection, the self-releasing feature including said upper and lower links moving with respect to each other when said roll back frame is moved from said loading position towards said transport position, said pin abutting said notch after a small amount of relative movement between said links, said pin abutting said notch causing said links to move to said bent position.

7. A trailer assembly as recited in claim 6, wherein said pivotal connection of said lower link to said truck spring including a quick release pin, said roll back frame having a disengagement bracket for connection of said lower link when it is not desired to have utilize said means for lowering.

8. A trailer assembly for transporting vehicles comprising:
   a main frame supported a vertical distance off the ground;
   a roll back frame supported on said main frame and moveable relative thereto from a transport position at which it is removed from the ground, to a loading position at which it has moved downwardly through said vertical distance and engages the ground;
   means for lowering said main frame to reduce said vertical distance, thus lessening an approach angle defined by said roll back frame and the ground when said roll back frame is in said loading position, said means for lowering being self-actuated by the movement by said roll back frame from said transport position towards said loading position; and
   wherein said means for lowering is a two-bar linkage with an upper link pivotally connected to said roll back frame and a lower link operably connected to said main frame, said upper and lower links being connected to each other at a central connection.

9. A trailer assembly as recited in claim 8, wherein said upper link having a notch adjacent said central connection and said lower link having a pin adjacent said central connection, said pin being positioned outwardly of said notch when said upper and lower links are in a bent position with respect to each other and said pin being received within said notch when said upper and lower links have moved to an aligned position with respect to each other.

10. A trailer assembly as recited in claim 9, wherein said center connection of said upper and lower links includes a center pin received through a slot in said lower link, said slot being elongate and extending for a distance greater than the diameter of said center pin thus allowing relative sliding movement of said upper link with respect to said lower link at said central connection, the self-releasing feature including said upper and lower links moving with respect to each other when said roll back frame is moved from said loading position towards said transport position, said pin abutting said notch after a small amount of relative movement between said links, said pin abutting said notch causing said links to move to said bent position.

* * * * *